United States Patent Office 3,033,819
Patented May 8, 1962

3,033,819
PRODUCTION OF DIHYDRIC PHENOLS
AND EPOXIDE RESINS
Herbert P. Price and William J. Belanger, Louisville, Ky., assignors to Devoe & Raynolds Company, Inc., Louisville, Ky., a corporation of New York
No Drawing. Filed Oct. 24, 1958, Ser. No. 769,287
8 Claims. (Cl. 260—47)

This invention relates to improvements in the production of high molecular weight polyhydric phenols and also to the production of high molecular weight epoxide resins, and includes new processes of producing such products and the improved products so produced.

The improved products of the present invention are produced by the reaction of monochlorohydrin ethers of hydroxyalkyl and hydroxy-aliphatic ethers of dihydric phenols, with added dihydric phenol, or with added dihydric phenol and added epichlorohydrin, in the presence of an alkaline dehydrohalogenating agent.

The hydroxyalkyl or hydroxy-aliphatic ethers of dihydric phenols, from which the chlorohydrin ethers are prepared, can be readily prepared by reacting 1 mol of dihydric phenol with 1 mol of a simple or substituted alkyl or aliphatic chlorohydrin, using sodium hydroxide as the condensing or dehydrohalogenating agent; or by reacting 1 mol of dihydric phenol with 1 mol of a simple or substituted alkyl or aliphatic carbonate using potassium carbonate as the catalyst; or by reacting 1 mol of dihydric phenol with 1 mol of a simple or substituted aliphatic monoepoxide.

The formation of the hydroxyalkyl or hydroxyaliphatic ethers of a dihydric phenol is illustrated by the following equation, in which R is the aromatic nucleus of the dihydric phenol and R' is the radical of the simple or substituted alkyl group, including alkylether substituted alkyl groups, and which may be defined as a simple or substituted aliphatic divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups:

$$HO-R-OH + ClR'OH \xrightarrow{NaOH} HO-R-O-R'OH + NaCl$$

Examples of the hydroxyalkyl ethers are the hydroxyethyl ether of the dihydric phenol, such as bisphenol, in which R' is the —CH₂CH₂— group, which can readily be prepared by the reaction of ethylene chlorhydrin with a dihydric phenol with the use of caustic soda as the dehydrohalogenating agent. The use of glyceryl monochlorohydrin gives a hydroxy alkylether in which R' is the

—CH₂CHCH₂—
|
OH group, this being the dihydroxypropyl ether of the dihydric phenol.

In a similar manner, the use of other aliphatic chlorohydrins can be used to give other hydroxyalkyl or substituted hydroxyalkyl ethers of the dihydric phenols.

The dihydroxypropyl ether of the dihydric phenol can also be prepared by reacting 1 mol of the dihydric phenol with 1 mol of glycidol. And other monoepoxides can be similarly used to produce other hydroxyalkyl and substituted hydroxyalkyl derivatives. Thus, the use of phenylglycide ether for reacting with the dihydric phenol gives a product in which the group R' in the above formula is —CH₂—CH—
|
CH₂
|
O
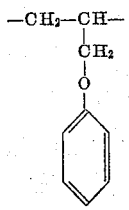

In this case, the alkyl group has a hydrocarbon ether substituent. Other simple or substituted hydroxyalkyl derivatives can be produced by the use of other monoepoxides such as ethylene oxide, butylglycidyl ether, isopropylglycidyl ether, styrene oxide, etc.

In addition to the simple and substituted hydroxyalkyl ethers, substituted in the alkyl group, somewhat more complex hydroxyalkyl or hydroxy-aliphatic derivatives of the dihydric phenols can be produced by reacting 1 mol of the dihydric phenol with the monochlorohydrin ether of a mono-, di-, or trihydric alcohol, or by reacting 1 mol of the dihydric phenol with 1 mol of a monoglycide ether such as the monoglycide ethers of di-, tri-, or higher polyhydric alcohols. For example, 1 mol of the monglycide ether of trimethylol propane can be reacted with 1 mole of a dihydric phenol such as bisphenol to form the corresponding hydroxy-containing monoether. Or 1 mol of the monochlorohydrin ether of trimethylol propane can be reacted with 1 mol of a dihydric phenol such as bisphenol to form the hydroxy-containing monoether. The resulting hydroxyalkyl or hydroxy-aliphatic ether of the dihydric phenol in this case will have a formula in which R' is the following group:

$$\begin{array}{cc} OH & CH_2OH \\ | & | \\ -CH_2CHCH_2OCH_2CCH_2- \\ & | \\ & CH_2 \\ & | \\ & CH_3 \end{array}$$

The hydroxyalkyl or hydroxy-aliphatic ethers of the dihydric phenols have both alcoholic hydroxyl and phenolic hydroxyl groups.

The monochlorohydrin ethers are produced by reacting 1 mol of the hydroxyalkyl ether or of the hydroxy-aliphatic ether of the dihydric phenol with 1 mol of epichlorohydrin in the presence of a condensation catalyst, and particularly a BF₃ catalyst such as a boron trifluoride ether complex or etherate, to form the chlorohydrin ether. This reaction of epichlorohydrin is with the alcoholic hydroxyl group, or with one of the alcoholic hydroxyl groups, leaving the phenolic hydroxyl group largely unreacted. This reaction is illustrated by the following equation, in which R and R' have the same meaning above indicated:

$$HO-R-O-R'-OH + CH_2CHCH_2Cl \xrightarrow{BF_3}$$
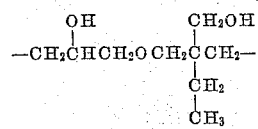

$$HO-R-O-R'-O-CH_2CHCH_2Cl$$
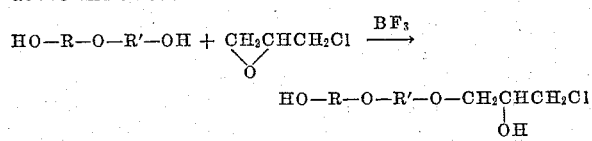

Such monochlorohydrin ethers have a free terminal phenolic hydroxyl which can react with epoxide groups by direct addition. The other end of the molecule of the monochlorohydrin ether is a chlorohydrin group which, on dehydrohalogenation, is converted to an epoxide group, which can react by direct addition with a phenolic hydroxyl group.

The reaction of such a monochlorohydrin ether with added dihydric phenol, and an alkaline agent such as caustic alkali, results in dehydrohalogenation of the chlorohydrin group and reaction of the resulting epoxide group with phenolic hydroxyls which may be the free phenolic hydroxyls of other molecules of the monochlorohydrin ether or which may also be the phenolic hydroxyls of the added dihydric phenol.

In the absence of the added dihydric phenol, the monochlorohydrin ethers, on dehydrohalogenation, tend to form long chain polymers as a result of the reaction of the epoxy and phenolic groups; and the resulting polymeric products tend to be of indefinite length.

When, however, a dihydric phenol is added to the chlorohydrin ether prior to dehydrohalogenation, the reaction of the chlorohydrin ether with itself can be limited and controlled and products produced on dehydrohalogenation which are essentially dihydric phenols.

The amount of dihydric phenols added to the monochlorohydrin can be varied, but in general will not be more than about 1 mol of dihydric phenol per mol of monochlorohydrin ether. Only 1 mol of dihydric phenol can be used to react with the chlorohydrin ether per mol of new high molecular weight dihydric phenol to be produced on dehydrohalogenation. Higher molecular weight dihydric phenols can be produced by using 2 or more mols of monochlorohydrin ether per mol of dihydric phenol. As the number of mols of chlorohydrin ether increases per mol of dihydric phenol, the molecular weight of the dihydric phenol produced increases. The nature of the dihydric phenols produced is illustrated by the following formula:

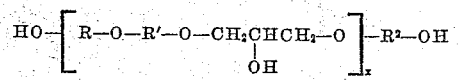

in which R and R′ have the meaning previously indicated, $R^2$ is the residue of added dihydric phenol, and $x$ is the degree of polymerization or the number of mols of chlorohydrin ether reacted per mol of dihydric phenol.

The simplest dihydric phenol would be one produced from 1 mol of monochlorohydrin ether reacted with 1 mol of a simple dihydric phenol in the presence of 1 mol of alkali, such as illustrated by the above formula where $x$ equals 1, resulting from the reaction of one of the hydroxyls of the dihydric phenol with the epoxide group formed from the chlorohydrin ether on dehydrohalogenation, leaving a free phenolic hydroxyl group from the added phenol and a free phenolic hydroxyl group from the chlorohydrin ether phenol.

When two or more mols of the chlorohydrin ether are present for each mol of the dihydric phenol, more complex and higher molecular weight dihydric phenols are produced. The amount of dihydric phenol added can accordingly serve to regulate and limit the extent of the polymerization of the monoglycide ether on dehydrohalogenation. Thus, a product produced by reacting 10 mols of the chlorohydrin ether with 1 mol of dihydric phenol in the presence of alkali would theoretically correspond to a polymeric product such as illustrated by the above formula, where $x$ equals 10.

Different dihydric phenols can be used in the hydroxyalkyl and hydroxy-aliphatic ethers, including dihydric phenols such as are used with epichlorohydrin in the presence of caustic alkali for producing epoxy resins, including resorcinol, hydroquinone, bisphenol (p,p′-dihydroxy diphenyl dimethyl methane), dihydroxydiphenyl, etc.

Similarly, different dihydric phenols can be used for addition to the chlorohydrin ether before dehydrohalogenation, such as those above indicated. Dihydric phenols can also be used which result from the reaction of a dihydric phenol with epichlorohydrin, e.g., in the proportion of 2 mols of dihydric phenol to 1 mol of epichlorohydrin.

Different alkaline dehydrohalogenating agents can be used for the dehydrohalogenation, including alkali metal complexes and salts such as sodium silicate, sodium zincate, etc.

The complex high molecular weight dihydric phenols produced as above described are advantageously used for the production of epoxide resins therefrom by reacting them with epichlorohydrin in the the presence of caustic alkali. When the high molecular weight dihydric phenols are thus used, the process is in effect a two-step process for producing epoxide resins, in which the chlorohydrin ethers are subjected to dehydrohalogenation with the addition of a dihydric phenol to produce a high molecular weight dihydric phenol which is then subjected to reaction with epichlorohydrin and caustic alkali to produce an epoxide resin.

In this reaction of the high molecular weight dihydric phenols with epichlorohydrin, varying amounts of epichlorohydrin can be used. For conversion of the dihydric phenols into epoxide resins which are largely diglycide ethers of the high molecular weight dihydric phenol, a considerable excess of epichlorohydrin can be used, such as a ratio of 10 mols of epichlorohydrin per mol of complex dihydric phenol. While only 2 mols of the epichlorohydrin can react with the dihydric phenol, the excess serves as a solvent and reaction medium and tends to promote the formation of a monomeric diglycide ether of the high molecular weight dihydric phenol.

The reaction of the high molecular weight dihydric phenol with epichlorohydrin can also be carried out using 2 mols of epichlorohydrin per mol of dihydric phenol in the presence of aqueous caustic alkali, or less than 2 mols of epichlorohydrin per mol of complex dihydric phenol, in which case more complex and higher molecular weight epoxide resins are produced.

The diglycide ethers, and higher molecular weight and more complex epoxide resins, produced from the high molecular weight dihydric phenols are characterized by having a number of aliphatic and aromatic groups between the terminal epoxide groups.

Instead of carrying out the dehydrohalogenation of the chlorohydrin ethers, with only the dihydric phenol added, the process is advantageously further modified by the addition of a regulated amount of epichlorohydrin as well as dihydric phenol prior to the dehydrohalogenation, and then subjecting the mixture to dehydrohalogenation with an amount of alkali sufficient to dehydrohalogenate the monochlorohydrin group and to cause reaction of the epichlorohydrin with phenolic hydroxyls of the chlorohydrin ether and of the dihydric phenols.

In this one-step process, in which both epichlorohydrin and dihydric phenol are added to the chlorohydrin ether before dehydrohalogenation, the proportions of monochlorohydrin ether and of added dihydric phenol can be varied over a considerable range. The epichlorohydrin, however, should be present in an amount sufficient to react with the phenolic groups of the dihydric phenol and of the chlorohydrin ether, although the phenolic hydroxyls may, in part, react with the epoxide group resulting from dehydrohalogenation of the chlorohydrin ether. In general, the amount of chlorohydrins should approximate or be somewhat in excess of the number of mols of the added dihydric phenol.

This composite process, in which both dihydric phenol and epichlorohydrin are admixed with the monochlorohydrin ether before dehydrohalogenation, has the advantage over the two-step process above referred to that epoxide resins can be directly produced of a composite or heterogeneous nature by a one-stage process.

When both the dihydric phenol and the epichlorohydrin are present with the chlorohydrin ether, and the mixture is subjected to treatment with alkali to effect dehydrohalogenation, the glycidyl groups resulting from dehydrohalogenation of the chlorohydrin groups can react with the phenolic hydroxyl groups of other chlorohydrin molecules or with hydroxyl groups of the added dihydric phenol. Similarly, the epichlorohydrin, or dehydrohalogenation, can react in part with the phenolic hydroxyl groups of the monochlorohydrin and in part with the hydroxyl groups of the dihydric phenol.

Depending upon the proportions or ratios of the materials, products of different properties can be obtained.

For the production of epoxide resins, the chlorohydrin groups of the epichlorohydrin and of the monochlorohydrin ether should be in excess of the phenolic hydroxyls.

The amount of dihydric phenol used is limited when the dehydrohlogenation is carried out in the absence of epichlorohydrin, the amount being not greater than about 1 mol of dihydric phenol per mol of monochlorohydrin ether, although the addition of a larger ratio of the monochlorohydrin ether to a smaller ratio of dihydric phenol gives a high molecular weight dihydric phenol, as above indicated.

Where, however, epichlorohydrin is present as well as dihydric phenol, the ratios of proportions of dihydric phenol to monochlorohydrin ether can be widely varied, provided sufficient epichlorohydrin is present to react with the added dihydric phenol and the phenolic groups of the chlorohydrin ether to the extent necessary to insure the production of an epoxide resin.

In this one-step process, in which epichlorohydrin is present during the dehydrohalogenation, the amount of epichlorohydrin used should not in general exceed to any great extent 2 mols for each mol of added dihydric phenol and may be somewhat less where high molecular weight resins are desired.

In carrying out the reaction, the amount of dehydrohalogenating agent used is sufficient to dehydrohalogenate the chlorohydrin ether and also to bring about reaction of the added epichlorohydrin.

Different alkaline dehydrohalogenating agents can be used, including alkali metal complexes and salts such as sodium silicate, sodium aluminate, sodium zincate, etc. A solution of caustic alkali is advantageously used in carrying out the process.

The monochlorohydrin ethers used can very both in the dihydric phenols from which they are formed and in the alkyl or aliphatic groups of the chlorohydrin ether, as previously indicated.

Different unsubstituted and substituted hydroxyalkyl ethers of dihydric phenols can be used in making the monochlorohydrin ethers and the final diglycidyl ethers, varying both in the dihydric phenol used and in the hydroxy-alkyl or hydroxy-aliphatic ether groups, as previously indicated. The hydroxyethyl ethers of dihydric phenols, such as bisphenol, are particularly advantageous; but higher mono- or polyhydroxyalkyl ethers can be used, such as the hydroxypropyl and hydroxybutyl ethers, and including substituted as well as unsubstituted hydroxyalkyl and hydroxy-aliphatic ethers.

In the chlorohydrin ethers which are formed in the manner above described, most of the chlorine is active chlorine, while some small amount of the chlorine may be present as inactive chlorine. These terms, as used in the following examples, are defined as follows:

The active chlorine is defined as the chlorine on a carbon atom adjacent to a carbon atom containing a hydroxyl group, as follows:

(1) 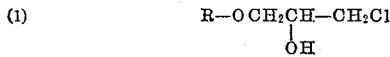

This compound is easily dehydrohalogenated to give an epoxide compound.

Inactive chlorines are formed by the additional of epichlorohydrin to the hydroxyl group in the above compound.

(2) 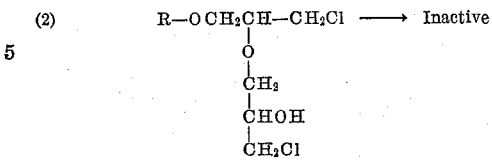

The above labeled chlorine cannot be removed to form an epoxide group since no hydroxyl is present on an adjacent carbon.

The invention will be further illustrated by the following specific examples, but it will be understood that the invention is not limited thereto.

Example 1 illustrates the production of a high molecular weight dihydric phenol of a polymeric nature by the reaction of 1 mol of bisphenol with 3 mols of the monochlorohydrin ether of the monohydroxy ethyl ether of bisphenol.

*Example 1*

To a one liter flask equipped with condenser, stirrer, and thermometer were added 57 g. (0.25 mol) of bisphenol, 500 cc. $H_2O$ and 36 g. (0.9 mol) of NaOH. After solution was attained, 274 g. (0.75 mol) of the monochlorohydrin ether of the phenol alcohol was added. Heat was applied and 100° C. temperature was held for thirty minutes. The taffy resin was then washed with boiling water until neutral. The resin was dried by heating to 150° C. The product, recovered in 89% yield (269 g.), had no epoxide content, total chlorine of 2.6%, active chlorine of 0.4%, Durran's melting point of 78° C. and Gardner viscosity of G–H at 40% N.V. in butyl Carbitol.

The following example illustrates the preparation of a dihydric phenol by reacting one mol of the monochlorohydrin ether of the monohydroxy ethyl monoether of bisphenol with one mol of bisphenol.

*Example 2*

To a one liter flask equipped with thermometer, stirrer, and condenser was added 171 g. (0.75 mol) of bisphenol, 500 cc. of water, and 30 g. (0.75 mol) of NaOH. On dissolution 273 g. (.75 mol) of the monochlorohydrin ether described above was added. Heat was applied to 100° C. and held for 30 minutes. The resinous product was washed with boiling water until neutral to pH paper. The excess water was decanted and the product was dried by heating to 150° C.

The product recovered in 90.5% yield (376 g.) had no epoxide value, total Cl=1.56%, active Cl=0.1%, Durran's M.P.=68° C., Gardner viscosity at 40% N.V. in butyl Carbitol=G.

The following examples illustrate the production of a high molecular weight polyhydric phenol, followed by its reaction with epichlorohydrin to form an epoxide resin.

*Example 3*

This compound was prepared by reacting three mols of the monochlorohydrin ether of the monohydroxyethyl ether of bisphenol with one mol of bisphenol followed by addition of NaOH and two mols of epichlorohydrin, using the reactants in the following amounts: 57 g. bisphenol (0.25 mol), 33 g. NaOH (0.825 mol), 500 cc. water, 274 g. monochlorohydrin ether of the monohydroxyethyl ether of bisphenol (0.75 mol).

After heating the above reaction at 100° C. for thirty minutes, the temperature was lowered and 24 g. (0.6 mol) of NaOH followed by 47 g. (0.5 mol) of epichlorohydrin were added and heated at 100° C. for thirty minutes. The resin was washed until neutral and dried by heating to 150° C. The product in 99.5% yield (329 g.) had a wt./e. of 10,780, total chlorine of 1.8%, active chlorine of 0.5%, Durran's melting point of 101° C. and Gardner viscosity of T–U at 40% N.V. in butyl Carbitol.

*Example 4*

This compound was prepared by reacting one mol of the monochlorohydrin ether of the monohydroxy ethyl monoether of bisphenol with one mol of resorcinol followed by reaction with 1.33 mols of epichlorohydrins.

To a one liter flask equipped with stirrer, thermometer and condenser was added 55 g. (0.5 mol) of resorcinol, 300 cc. water, and 24 g. (0.6 mol) of NaOH. After dissolution 182 g. (0.5 mol) of the monochlorohydrin ether described above was added. Heat was applied to 100° C. and held for 30 minutes. The solution was cooled and 32 g. (0.8 mol) of NaOH and 62 g. (0.67 mol) of epichlorohydrin were added. Heat was applied to 100° C. and held for 30 minutes. The taffy resin was washed with boiling water until neutral to pH paper.

The product in 92% yield (236 g.) had a wt./epoxide of 18,000, total Cl=2.7%, active Cl=0.5%, Durran's M.P.=100° C. and Gardner viscosity at 40% N.V. in butyl Carbitol slightly higher than $Z_6$.

*Example 5*

This compound was prepared by reacting one mol of the monochlorohydrin ether of the monohydroxy ethyl monoether of resorcinol with one mol of bisphenol followed by reaction with 2 mols of epichlorohydrin.

Using the same procedure as described in Example 4, the following materials were reacted: 114 g. (0.5 mol) bisphenol, 750 cc. $H_2O$, 22 g. (0.55 mol) NaOH, 123.5 g. (0.5 mol) monochlorohydrin ether. After these had reacted, the following were added: 44 g. (1.1 mols) NaOH and 92.5 g. (1 mol) epichlorohydrin. After workup the product was found to have the following properties: Wt./epoxide 1015, percent total Cl 1.26, percent active Cl 0.38, Durran's M.P. 71° C., Gardner viscosity. I–J (40% N.V. in butyl Carbitol).

The following examples illustrate the modified single-stage process, in which the monochlorohydrin ether is reacted both with a dihydric phenol and epichlorohydrin in the presence of a dehydrohalogenating agent to form an epoxide resin.

*Example 6*

This resin was prepared by reacting one mol of the monochlorohydrin ether of the monohydroxy ethyl ether of bisphenol with one mol of bisphenol and 1.33 mols of epichlorohydrin in one step, using the reaction in the following amounts: 171 g. bisphenol (0.75 mol), 273 g. monochlorohydrin ether of monohydroxyethyl ether of bisphenol (0.75 mol), 92.5 g. epichlorohydrin (1 mol), 74 g. NaOH (1.85 mols), 1250 cc. water. The resin analysis showed the following: 92% yield, 1861 wt./e., 1.5% total chlorine, 0.6% active chlorine, R–S Gardner viscosity (40% N.V. in butyl Carbitol), and 92° C. Durran's melting point.

*Example 7*

This compound was prepared by reacting one mol of the monochlorohydrin ether of the monohydroxy ethyl monoether of resorcinol with one mol of bisphenol and 2 mols of epichlorohydrin in one step. The following compounds were reacted: 114 g. (0.5 mol) bisphenol, 1000 cc. $H_2O$, 72 g. (1.8 mols) NaOH, 123.5 g. (0.5 mol) monochlorohydrin ether, 92.5 g. (1 mol) of epichlorohydrin. On workup, the resin was found to have the following analysis: Wt./epoxide 616, percent total Cl 0.7, percent active Cl 0.1, Durran's M.P. 57° C., Gardner viscosity D–E (40% N.V. in butyl Carbitol).

In a similar manner, other hydroxyalkyl and hydroxy-aliphatic ethers of dihydric phenols, such as those hereinbefore referred to and illustrated by the general formula hereinbefore given, can be prepared and reacted with epichlorohydrin to give the monochlorohydrin ethers; and these can be used in a similar manner and subjected to dehydrohalogenation with the addition of dihydric phenols or with both added dihydric phenol and added epichlorohydrin.

The high molecular weight dihydric phenols produced by the present invention are valuable not only for the production of epoxide resins therefrom, by reaction with epichlorohydrin and caustic alkali, but they can be used for other purposes where both phenolic and alcoholic hydroxyl groups are present, since a number of intermediate alcoholic hydroxyl groups are present in the molecule in addition to the terminal phenolic hydroxyl groups. They may thus be cross-linked either through the phenolic hydroxyl groups or through the alcoholic hydroxyl groups, e.g. by diisocyanates, etc.

The epoxide resins produced either by the two-step process of Examples 3 and 4 or by the single-stage process of Examples 5 and 6 are valuable epoxide resins which have an important aliphatic constituent or component in addition to the aromatic phenolic residues.

These epoxide resins can be used in forming films, for coating compositions, and can be cured by amine or other epoxide resin curing catalysts.

We claim:

1. The method of producing high molecular weight polymeric products which comprises subjecting monochlorohydrin ethers of hydroxy-aliphatic ethers of a dihydric phenol having the following general formula

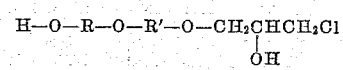

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, to dehydrohalogenation with an alkaline dehydrohalogenating agent in admixture with an added dihydric phenol.

2. The method of producing high molecular weight polymeric products which comprises subjecting monochlorohydrin ethers of hydroxy-aliphatic ethers of a dihydric phenol having the following general formula

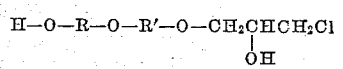

in which R is the aromatic nucleus of a dihydric phenol and R' is a divalent radical containing at least 2 carbon atoms selected from the group consisting of aliphatic hydrocarbon groups, hydroxy-substituted aliphatic hydrocarbon groups, hydrocarbon ether-substituted aliphatic hydrocarbon groups, and hydroxy-substituted hydrocarbon ethers of aliphatic hydrocarbon groups, to dehydrohalogenation with an alkaline dehydrohalogenating agent in the presence of an added dihydric phenol and also in admixture with epichlorohydrin in an amount not greater than about 2 mols of epichlorohydrin for each mol of added dihydric phenol and 1 mol for each mol of chlorohydrin ether.

3. The process according to claim 1, in which the ratio of added dihydric phenol is not greater than 1 mol for each mol of the monochlorohydrin ether with resulting production, on dehydrohalogenation, of a dihydric phenol.

4. The process according to claim 3, in which the dihydric phenol produced is reacted with epichlorohydrin in admixture with caustic alkali to form an epoxide resin.

5. The method of producing high molecular weight resinous products which comprises subjecting a monochlorohydrin ether of a hydroxyethyl ether of a dihydric phenol containing at least 2 carbon atoms in the alkyl group, and containing a phenolic hydroxyl group, to dehydrohalogenation in admixture with an added dihydric phenol.

6. The method of producing high molecular weight resinous products which comprises subjecting a monochlorohydrin ether of a monohydroxyethyl ether of a dihydric phenol containing at least 2 carbon atoms in the alkyl group, and containing a phenolic hydroxyl group, to dehydrohalogenation in admixture with an added dihydric phenol and also in admixture with epichlorohydrin in an amount not greater than about 2 mols of epichlorohydrin for each mol of added dihydric phenol.

7. The process according to claim 5 in which the ratio of added dihydric phenol is not greater than 1 mol for each mol of the monochlorohydrin ether with resulting production, on dehydrohalogenation, of a dihydric phenol.

8. The process according to claim 7 in which the dihydric phenol formed is reacted with epichlorohydrin to form an epoxide resin.

References Cited in the file of this patent

UNITED STATES PATENTS 2,538,072   Zech _____ Jan. 16, 1951